United States Patent
Hitzler et al.

(10) Patent No.: US 9,238,706 B2
(45) Date of Patent: Jan. 19, 2016

(54) USE OF GUANIDINE DERIVATIVES AS CURING ACCELERATORS FOR EPOXY RESINS

(75) Inventors: Martin Hitzler, Gottmadingen (DE); Hans-Peter Krimmer, Kirchweidach (DE); Sylvia Strobel, Garching (DE); Monika Brandl, Tacherting (DE)

(73) Assignee: AlzChem AG, Trostberg (DE)

( * ) Notice: Subject to any disclaimer, the term of this patent is extended or adjusted under 35 U.S.C. 154(b) by 479 days.

(21) Appl. No.: 13/498,435

(22) PCT Filed: Nov. 5, 2010

(86) PCT No.: PCT/EP2010/066951
§ 371 (c)(1),
(2), (4) Date: Mar. 27, 2012

(87) PCT Pub. No.: WO2011/054945
PCT Pub. Date: May 12, 2011

(65) Prior Publication Data
US 2012/0208925 A1 Aug. 16, 2012

(30) Foreign Application Priority Data
Nov. 5, 2009 (DE) .................. 10 2009 052 061

(51) Int. Cl.
| C08L 63/00 | (2006.01) |
| C08G 63/91 | (2006.01) |
| C08G 59/50 | (2006.01) |
| C08G 59/40 | (2006.01) |
| C08G 59/68 | (2006.01) |

(52) U.S. Cl.
CPC ............ *C08G 59/50* (2013.01); *C08G 59/4021* (2013.01); *C08G 59/686* (2013.01)

(58) Field of Classification Search
CPC ................................... C08G 59/4021
USPC .......................................... 528/88
See application file for complete search history.

(56) References Cited

U.S. PATENT DOCUMENTS

| 3,397,156 A | * | 8/1968 | Lopez et al. ............. 528/93 |
| 3,575,926 A | | 4/1971 | Joyce et al. |
| 3,660,316 A | | 5/1972 | Schaefer et al. |
| 4,833,204 A | | 5/1989 | Masami et al. |
| 5,534,565 A | | 7/1996 | Zupancic et al. |
| 2009/0032286 A1 | | 2/2009 | Masaaki et al. |

FOREIGN PATENT DOCUMENTS

| DE | 10 2006 056 311 A1 | 6/2008 |
| JP | 61-207425 A | 9/1986 |
| WO | WO 92/01726 A1 | 2/1992 |
| WO | WO 94/14866 A1 | 7/1994 |

OTHER PUBLICATIONS

Hitzler et al., Machine-generated English translation of DE 102006056311 A1, Jun. 5, 2008.*
Suzuki et al., JP 61-207425 A machine-generated English translation, Sep. 13, 1986.*
English translation of Japanese patent application JP 61-207425, filed Mar. 12, 1985, published Sep. 13, 1986 inventors: Suzuki, et al.

* cited by examiner

*Primary Examiner* — David Karst
(74) *Attorney, Agent, or Firm* — Norton Rose Fulbright US LLP

(57) ABSTRACT

The present invention describes guanidine derivatives of the general formula (I)

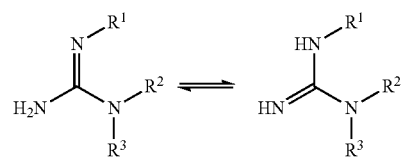

having the stated meanings for the residues $R^1$, $R^2$ and $R^3$ as accelerators for cold-curing epoxy resin compositions. The curing of cold-curing epoxy resin systems may advantageously be accelerated with the assistance of these compounds.

23 Claims, No Drawings

USE OF GUANIDINE DERIVATIVES AS CURING ACCELERATORS FOR EPOXY RESINS

This application is a §371 of PCT/EP2010/066951 filed Nov. 5, 2010, and claims priority from DE 10 2009 052 061.9 filed Nov. 5, 2009.

The present invention relates to guanidine derivatives, to the use thereof as curing accelerators in cold-curing epoxy resins and to a method for producing cold-curing epoxy resins.

Thermosetting epoxy resins are very widely used due to their good chemical resistance, their very good thermal and dynamic mechanical properties and their elevated dielectric strength. They moreover exhibit good adhesion to many substrates. Due to these properties they preferably serve as a low-shrinkage matrix for fibre-reinforced composites which are used as structural elements which are simultaneously of a low weight. Epoxy resins are furthermore often found as constituents of casting resins, electrical laminates, structural adhesives, powder coatings and encapsulation compounds (cf. G. W. Ehrenstein, Faserverbund-Kunststoffe [fibre composite plastics], 2006, 2nd edition, Carl Hanser Verlag, Munich, pages 63-68; and M. Reyne, Composite Solutions, 2006, JEC Publications, pages 31-37).

Epoxy resins cure by various mechanisms. In addition to curing with phenols or anhydrides, curing is frequently carried out with amines. This is achieved by adding the stoichiometric quantity of hydrogen atoms, as are for example supplied by difunctional amines. Reference is made in this connection to chapter 2 "Curing agents for epoxy resins" in "Chemistry and Technology of Epoxy Resins" by Bryan Ellis, published in 1993 by Verlag Blackie Academic & Professional. It is described herein that crosslinking is often carried out by means of aromatic, aliphatic, araliphatic or cycloaliphatic amines, polyamides, polyamidoamines, polyetheramines or Mannich bases. Due to their elevated reactivity and thus low latency, such epoxy resin curing agent compositions are for the most part formulated in two components. This means that the resin (A component) and curing agent (B component) are stored separately and only mixed together in the correct ratio just before being used. "Latent" here means that, under defined storage conditions and for defined storage periods, a mixture of the individual components is stable and does not cure rapidly until it has been activated, generally thermally (H. Sanftenberg, M. Fedke *Angew. Makrom. Chem.* 1995, 225, 99-107). Such cold-curing epoxy resin compositions are often subjected to thermal post-treatment in order to take crosslinking to completion and to achieve the desired final properties of the thermosetting material. A typical temperature range for thermal post-treatment is between 60 and 80° C.

In contrast, single-component, hot-curing mixtures are preformulated in a ready-to-use form, so ruling out errors in mixing of the individual components in on-site use. A prerequisite for this purpose are latent curing agent systems which are stable (storable) at room temperature, but readily react to completion when heated. Dicyandiamide (DICY) is, for example, a particularly suitable and also inexpensive curing agent for such single-component epoxy resin formulations. Corresponding resin-curing agent mixtures may be stored under ambient conditions for up to six (6) months while remaining usable. This property is above all due to the insolubility of DICY in epoxy resins at ambient temperature (Bryan Ellis, *Chemistry and Technology of Epoxy Resins*, 1993, Verlag Blackie Academic & Professional, page 49). However, due to the pronounced chemical inertness of DICY, such systems require long curing times at elevated temperature (R. Lopez, 1966, U.S. Pat. No. 3,391,113; G. Ott, 1949, U.S. Pat. No. 2,637,715 B1; J. v. Seyerl, 1984, EP 0 148 365). Accelerators may be used in combination with the dicyandiamide curing agent in order to reduce curing temperatures. Compounds which exhibit these properties are inter alia urones (Th. Güthner, B. Hammer *J. Appl. Polym. Sci.,* 1993, 50, 1453-1459; Brockmann et al. *J. Adhesion & Adhesives,* 2000, 20, 333-340; Poisson et al. *J. Appl. Polym. Sci.,* 1998, 69, 2487-2497) or imidazoles (GB 1 050 679). While extraordinarily long latency times are described for urone systems, imidazole formulations with or without dicyandiamide generally have a short pot life of just a few hours (Bryan Ellis, *Chemistry and Technology of Epoxy Resins,* 1993, Verlag Blackie Academic & Professional, pages 58-60).

German published patent application DE 19 51 600 describes adhesives which cure rapidly at room temperature or below and consist of a combination of epoxy resin, an ethylenepolyamine such as for example diethylenetriamine (DETA), N-(aminoethyl)-piperazine, dicyandiamide (DICY) and an imidazole compound. Specifically, it is disclosed that both an imidazole and DICY are absolutely essential for carrying out the invention.

German patent DE 21 31 929 describes the use of a combination of amines and DICY for producing heat-curable, thickened epoxy resin compounds. The problem of interest of being able to provide soft, maximally non-tacky, but storage-stable epoxy resin compounds which cure rapidly on exposure to heat is solved by prethickening the compounds by means of reactive amine curing agents. The unreacted DICY still remaining in the prethickened compound is then capable of taking the crosslinking to completion by exposure to heat.

German patent application DE 10 2006 056 311 A1 furthermore describes heat-curing epoxy resin formulations which exhibit very good storage stability (latency). In addition to dicyandiamide as curing agent, selected guanidine derivatives are used as accelerators in these formulations. The stated epoxy resin formulations take the form of single-component systems.

Various cyanoguanidines are furthermore described as curing agents in European patent application EP 310 545 A2 and international patent application WO 92/01726 A1. These curing agents exhibit good latency and are thus highly suitable for heat-curing epoxy resin formulations which are intended to exhibit good storage stability.

The object of the present invention is accordingly to provide suitable accelerators for cold-curing epoxy resin systems with elevated reactivity and thus low latency. The aim is to provide such accelerators which have a high cost/benefit advantage, it simultaneously being intended for these substances to be readily meterable. It is furthermore intended to provide a method for producing cold-curing epoxy resins using these accelerators.

These objects have been achieved according to the invention by the use of guanidine derivatives according to claim 1.

It has here surprisingly been found that the guanidine derivatives of the formula (I), which are otherwise known as curing agents with elevated latency and are stable for an extended period at room temperature in epoxy compounds, may be used as accelerators for cold-curing epoxy resin systems, in particular cold-curing epoxy resin systems comprising amine curing agents. These guanidine derivatives accelerate curing of epoxy compounds, in particular cold-curing epoxy compounds comprising amine curing agents, such that curing times when using one and the same amine curing agent may be reduced by as much as half. Furthermore, the listed guanidine derivatives of the formula (I) are solids, as a result of which they may be metered in a particularly simple and reliable to handle manner.

In the context of the present invention, cold-curing epoxy resin compositions should here be taken to mean those compositions which have a gel time at room temperature of at most 48 hours.

In the light of the knowledge that amines generally readily initiate curing at temperatures as low as room temperature, but the highly latent guanidine derivatives may only be activated by elevated temperatures, it was all the more surprising that precisely the highly chemically inert guanidine derivatives of the formula (I) should additionally accelerate amine curing which readily starts at temperatures as low as room temperature. The present invention accordingly provides guanidine derivatives of the general formula (I) as curing accelerators for cold-curing epoxy resin compositions,

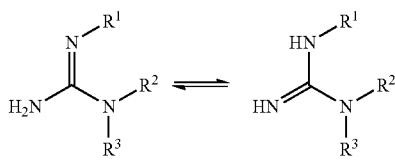

Formula (I)

wherein: $R^1$=—CN, —$NO_2$, —(C=O)—$R^4$,
$R^2$=—H, alkyl, benzyl, phenyl, aryl,
—(C=O)—$R^4$,
$R^3$=—H, alkyl,
$R^4$=—H, alkyl, —$NH_2$, —NH-alkyl,
—O-alkyl,
and wherein, where $R^1$=—CN, $R^2$ does not simultaneously =$R^3$=—H.

Derivatives of the formula (I) which are particularly preferred are those for which $R^2$=alkyl or $R^3$=alkyl simultaneously or mutually independently denote the residues methyl, ethyl, n-propyl, isopropyl or n-butyl.

It has very particularly surprisingly proved that guanidine derivatives of the formula (I) which may be used as curing accelerators for cold-curing epoxy resin compositions are those for which:
$R^1$=—$NO_2$
$R^2$=—H, alkyl, benzyl, phenyl, aryl,
$R^3$=—H, alkyl.

These nitroguanidine derivatives are distinguished by particularly great acceleration of the curing time (cf. examples, Table 1).

It should be emphasised in this connection that the residues $R^2$=benzyl, phenyl or aryl according to the present invention also include substituted derivatives of benzyl, phenyl or aryl. In particular $R^2$ means chlorobenzyl, chlorophenyl or chloroaryl.

Non-limiting examples of preferably used guanidine derivatives of the general formula (I) according to the invention are: 1,1-dimethyl-3-cyanoguanidine, 1-acetyl-3-cyanoguanidine, 1-(p-chlorophenyl)-3-cyanoguanidine, nitroguanidine, 1-methyl-3-nitroguanidine, 1-ethyl-3-nitroguanidine, 1-butyl-3-nitroguanidine, 1-benzyl-3-nitroguanidine, formylguanidine, acetylguanidine, carbamoylguanidine or methoxycarbonylguanidine.

According to a further aspect, the present invention thus also provides the use of guanidine derivatives of the formula (I) and the use of the stated and preferred guanidine derivatives as curing accelerators in cold-curing epoxy resin compositions.

It has here proved particularly advantageous for these guanidine derivatives to be used together with at least one amine curing agent for epoxy resins which is activatable at a temperature of <60° C.

It has here particularly surprisingly proved that these guanidine derivatives, despite exhibiting elevated latency in epoxy resins, accelerate the curing of cold-curing epoxy resin compositions to a particularly great extent. In particular, it is those epoxy resin compositions which comprise an amine curing agent which have their curing accelerated.

It may here in particular be provided that guanidine derivatives according to the invention are used together with amine curing agents from the group of alkyldiamines, aryldiamines, alkylpolyamines, arylpolyamines, polyetheramines, wherein each amine curing agent comprises at least two free amine groups.

Very particularly preferred amine curing agents are those from the group of ethylenediamine, diethylenetriamine, triethylenetetramine, meta-xylylenediamine, methylenedianiline, para-aminocyclohexylmethane, isophoronediamine and polyetheramines.

With regard to the quantities to be used, it has been found that the guanidine derivatives according to the invention may be used and utilised in a quantity of 0.01 to 15 wt. % relative to the epoxy resin composition. The guanidine derivatives may furthermore also be used and utilised in a ratio of 0.01 to 15 parts relative to 100 parts of epoxy resin.

The present invention is not subject to any restriction with regard to the epoxy resins to be cured. Consideration may be given to any conventional commercial products which conventionally comprise more than one 1,2-epoxy group and may here be saturated or unsaturated, aliphatic, cycloaliphatic, aromatic or heterocyclic. The epoxy resins may moreover comprise substituents such as halogens, phosphorus and hydroxyl groups. Epoxy resins based on glycidyl polyethers of 2,2-bis(4-hydroxyphenyl)propane (bisphenol A) and the bromine-substituted derivative (tetrabromobisphenol A), glycidyl polyethers of 2,2-bis(4-hydroxyphenyl)methane (bisphenol F) and glycidyl polyethers of novolaks and based on aniline or substituted anilines such as for example p-aminophenol, or 4,4-diaminodiphenylmethane may be particularly effectively cured by using the compounds according to the invention of the formula (I) in the presence of amines.

Preferred examples of the amine curing agents used according to the invention which may be mentioned are: ethylenediamine (EDA), diethylenetriamine (DETA), triethylenetetramine (TETA), meta-xylylenediamine (MXDA), methylenedianiline (MDA), para-aminocyclohexylmethane (PACM), isophoronediamine (IPDA), and polyetheramines (Jeffamines).

The epoxy resin compounds for the purposes of the invention are prepared on the basis of principles known to a person skilled in the art. To this end, in a first step, the resin and amine curing agent are homogeneously mixed together. The amine curing agent here preferably constitutes the crosslinking component and is thus used in the required stoichiometric quantity. The quantity used is usually directly dependent on the molecular weight of the selected amine compound and thus also on the particular specific HEW (Hydrogen Equivalent Weight) value. This may either be obtained from the manufacturer's data sheet or be obtained as the quotient resulting from dividing the molecular weight of the amine by the number of reactive NH functions. In addition, HEW value may also for example be determined more accurately by determining the maximum glass transition temperature (Tg max method). For stoichiometric curing of 100 parts of epoxy resin, the quotient of the HEW (amine) and the EEW (resin) is calculated and multiplied by 100. The EEW (epoxy equivalent weight) value of the resin is obtained the manufacturer's data sheet.

In the second step, guanidine derivatives of the formula (I) according to the invention are added as the accelerator, wherein the order in which the mixture of resin, curing agent, accelerator and optional further additives is prepared is not mandatory for the effect of the invention.

According to a further aspect, the present invention also provides a method for producing a cold-curing epoxy resin composition. In this method, the epoxy resin composition is produced by homogeneously intermixing the provided or added constituents, wherein the method comprises the following method steps
a. providing at least one epoxy resin with on average more than one epoxy group per molecule,
b. adding at least one amine curing agent for epoxy resins which is activatable at a temperature of <60° C.,
c. adding at least one guanidine derivative of the formula (I) as curing accelerator

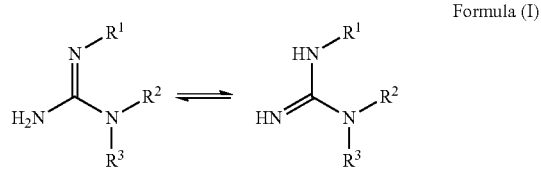

Formula (I)

wherein: $R^1$=—CN, —NO$_2$, —(C=O)—R$^4$,
$R^2$=—H, alkyl, benzyl, phenyl,
aryl, —(C=O)—R$^4$,
$R^3$=—H, alkyl,
$R^4$=—H, alkyl, —NH$_2$, —NH-alkyl,
—O-alkyl,
and wherein, where $R^2$=—CN, $R^2$ does not simultaneously —$R^3$=—H,
with the proviso that method steps b) and c) proceed in succession or simultaneously.

It has here surprisingly been found in this respect that simultaneous or successive addition of the components amine curing agent and guanidine derivative of the stated structure leads to a method, the outcome of which is a particularly rapidly cold-curing epoxy resin composition. This is all the more surprising given that the guanidine derivatives used according to the present invention have hitherto only been known as latent curing agents for cold-curing epoxy resins. A method for producing cold-curing epoxy resin compositions with particularly short setting times may accordingly be provided with the present method using guanidine derivatives according to the invention.

According to a furthermore preferred embodiment of the method, the amine curing agent is added first and then the curing accelerator. In this manner, particularly uniform and thus particularly homogeneous intermixing may be achieved.

Methods which proceed without additional input of heat are furthermore preferred.

It may moreover be provided according to the present invention that, before method steps b) or c), at least one auxiliary substance and/or additive is added, wherein the auxiliary substance and/or additive is preferably selected from the group of reactive diluents, fillers, rheological additives, thixotroping agents, dispersion additives, anticaking agents, dyes, pigments, impact modifiers and/or flameproofing additives.

It has in particular been found that methods in which 1,1dimethyl-3-cyanoguanidine, 1-acetyl-3-cyanoguanidine, 1-(p-chlorophenyl)-3-cyanoguanidine, nitroguanidine, 1-methyl-3-nitroguanidine, 1-ethyl-3-nitroguanidine, 1-butyl-3-nitroguanidine, 1-benzyl-3-nitroguanidine, formylguanidine, acetylguanidine, carbamoylguanidine or methoxycarbonylguanidine are used as curing accelerators in method step c) give rise to particularly rapidly curing epoxy resins.

Particularly preferred methods which should be emphasised according to the present invention are also those methods in which the above-described and preferred guanidine derivatives are used as curing accelerators.

With regard to amine curing agents, the amine curing agents which may in particular be used according to the present invention are those which are activatable at a temperature of >10° C. and <60° C., in particular of >10° C. and <40° C. It has here been found that the amine curing agents used may in particular be those curing agents which are selected from the group of alkyldiamine, aryldiamine, alkylpolyamine, arylpolyamine, polyetheramine, wherein these amine curing agents in each case comprise at least two free amine groups. For the purposes of the present invention, free amine groups are those amine groups which comprise two hydrogen atoms (—NH$_2$). Very particularly preferred methods are those in which the amine curing agent is selected from the group of ethylenediamine, diethylenetriamine, triethylenetetramine, meta-xylylenediamine, methylenedianiline, para-aminocyclohexylmethane, isophoronediamine and/or polyetheramines.

The auxiliary substances used likewise do not limit the performance of the invention. Dissolvers or kneaders are preferred methods for homogeneously blending the components.

No limits apply with regard to the quantity used of the curing accelerator of the formula (I) according to the invention. Preferably, 0.01 to 15 parts, preferably 0.1 to 15 parts, preferably 0.1 to 10 parts, preferably 0.1 to 5 parts and particularly preferably 0.5 to 1 parts are used per 100 parts of resin. The present invention also includes a combination of a plurality of curing accelerators of the formula (I).

Curing of the epoxy resins with the assistance of the compounds (I) used according to the invention generally proceeds at temperatures of 10 to 80° C. Selection of the curing temperature depends on specific processing and product requirements and may above all be varied by means of the formulation by adjusting the quantities of curing agent and by adding additives. It should in particular be noted in this connection that the described cold-curing systems may also proceed without further input of heat. The reactions here proceed spontaneously. For the purposes of the present invention, additional input of heat may, however, be provided in order to take the reactions to completion. The manner in which energy is supplied to the resin formulations is here immaterial. By way of example, energy may be supplied in the form of heat by a furnace or heating elements, but likewise by means of infrared radiation or excitation by microwaves or other kinds of radiation.

Without being tied to any particular theory, the accelerating action of the substituted guanidine derivatives (I) according to the invention on the amine curing of epoxy resins may be explained with reference to the formula (I).

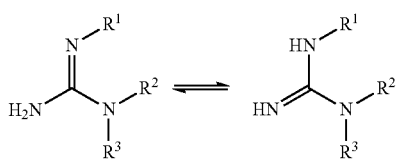

Formula (I)

with $R^1$=—CN, —NO$_2$, —(C=O)—$R^4$,
$R^2$=—H, alkyl, benzyl, phenyl, aryl,
—(C=O)—$R^4$,
$R^3$=—H, alkyl,
$R^4$=—H, alkyl, —NH$_2$, —NH-alkyl, —O-alkyl,
wherein, where $R^1$=—CN, $R^2$ does not simultaneously =$R^3$=—H.

Being organic bases, amines have a markedly nucleophilic nature. In contrast, guanidines have an electrophilic carbon atom. Attack by an amine curing agent on the guanidine carbon atom results, with elimination of either ammonia or a low molecular weight amine, in the formation of the corresponding guanidine compound substituted with the attacking amine curing agent. The essential teaching which may be drawn from the present invention is the recognition that low molecular weight amines or ammonia may be liberated from guanidines of the composition (I) by a substitution reaction of a higher molecular weight amine. Ammonia and low molecular weight amines such as for example dimethylamine exhibit higher reactivity towards epoxy groups than do the described conventionally commercially used amine curing agents. Guanidines (I) thus bear in their structure blocked low molecular weight amines which may be liberated in a equilibrium reaction by the action of other amines. Due to their higher reactivity, these are in turn capable of catalysing and so accelerating the curing of the epoxy resin.

The curing profile of the formulations according to the invention may be varied by the addition of further conventional commercial additives, as are familiar to a person skilled in the art for curing epoxy resins. Initiation temperatures may thus, for example, be further reduced as a function of the added quantity or alternatively the gel times and hence curing times may advantageously be adapted to technical specifications and thus to specific customer requirements.

Additives for improving the processability of the uncured epoxy resin compounds or for adapting the thermomechanical properties of the thermosetting products to the requirements profile comprise for example reactive diluents, fillers, rheological additives such as thixotroping agents or dispersion additives, anticaking agents, dyes, pigments, impact modifiers or flameproofing additives.

No restrictions apply either with regard to physical form whether it be of the resins or the curing agents, co-curing agents and the further additives. In particular, pulverulent components may be used in micronised or alternatively non-micronised form. The addition of solvents may be advantageous in many applications. Examples of solvents are water, various esters of glycol ethers, as well as ketones such as acetone, MEK, MIBK or solvents such as DMF, etc.

Epoxy resin formulations with the accelerators according to the invention are suitable for both manual and machine processing methods and in particular for producing impregnated reinforcing fibres, as described inter alia in the publications by G. W. Ehrenstein, Faserverbund-Kunststoffe [fibre composite plastics], 2006, 2nd edition, Carl Hanser Verlag, Munich, chapter 5, pages 148 ff, and M. Reyne, Composite Solutions, 2006, JEC Publications, chapter 5, pages 51 ff. In addition to use in prepreg methods, a further preferred processing method is in particular handling in infusion methods. The generally very good solubilities of the guanidine derivatives of the formula (I) both in the amine curing agents and in epoxy resins are advantageous, since flowable infusion resins of low viscosity are required for the impregnation process (cf. inter alia M. Reyne, Composite Solutions, 2006, JEC Publications, chapter 5, page 65; and G. W. Ehrenstein, Faserverbund-Kunststoffe [fibre composite plastics], 2006, 2nd edition, Carl Hanser Verlag, Munich, chapter 5, page 166).

Thanks to the favourable application characteristics of the curing agent formulation according to the invention and the inexpensive production thereof and a concomitant advantageous cost/benefits ratio, they are particularly well suited to industrial application.

The following examples illustrate the advantages of the present invention.

EXAMPLES

The following resin/curing agent components were used in the examples for illustrating the invention:

| Name | Short name | EEW | CAS no. |
|---|---|---|---|
| Expoxy resin: | | | |
| Bisphenol A-liquid resin[1] | Epikote 828 | 182-187 | [25068-38-6] |
| | average molecular weight <= 700 | | |

| Name | Short name | HEW | CAS no. |
|---|---|---|---|
| Amine curing agent: | | | |
| Isophoronediamine[2] | IPD | 43 | [2855-13-2] |
| Ethylenediamine[2] | EDA | 15 | [107-15-3] |
| Triethylenetetramine[2] | TETA | 25 | [112-24-3] |
| Meta-xylylenediamine[2] | MXDA | 34 | [1477-55-0] |
| Jeffamin JD-230[3] | JD-230 | 60 | [9046-10-0] |
| Guanidine curing accelerator: | | | |
| 1,1-Dimethyl-3-cyanoguanidine[4,6,7,8] | DMDCD | 16 | [1609-06-9] |
| 1-Acetyl-3-cyanoguanidine[4,9] | AcDCD | 21 | [63071-29-4] |
| 1-(p-Chlorophenyl)-3-cyanoguanidine[4,6,7,8] | CPDCD | 38 | [1482-62-8] |
| Nitroguanidine[5] | Nigu (NQ) | 27 | [556-88-7] |
| 1-Methyl-3-nitroguanidine[4,5,10,11] | MNQ | 34 | [4245-76-5] |
| 1-Ethyl-3-nitroguanidine[4,12] | ENQ | 38 | [39197-62-1] |
| 1-Butyl-3-nitroguanidine[5,11] | BuNQ | 40 | [5458-83-3] |
| Acetylguanidine[5,13,14] | AcGu | 17 | [5699-40-1] |
| Carbamoylguanidine[4,15] (guanylurea) | CarbamGu | 14 | [141-83-3] |
| Methoxycarbonylguanidine[5,16] | MetcarbGu | 24 | [30884-40-3] |

Origin of the epoxy resins and amine curing agents and origin and manufacture of the guanidine curing accelerators:
[1] Hexion Speciality Chemicals
[2] Sigma-Aldrich Group
[3] Huntsman Corporation
[4] Alzchem GmbH, Trostberg
[5] Nigu Chemie, Waldkraiburg
[6] U.S. Pat. No. 2,455,807 (American Cyanamid Co), 1948
[7] WO 92/01726 (Allied-Signal Inc), 1990
[8] U.S. Pat. No. 5,534,565 (Allied-Signal Inc), 1994
[9] U.S. Pat. No. 2,407,161 (American Cyanamid Co), 1946
[10] DE 19939609 (Nigu Chemie), 2001
[11] U.S. Pat. No. 2,559,085 (A. F. McKay), 1951
[12] A. F. McKay *J. Am. Chem. Soc.* 1949, 71, 1968-70
[13] W. Traube *Ber. Deutsch. Chem. Ges.* 1911, 43, 3586-90
[14] U.S. Pat. No. 2,408,694 (Libby-Owens-Ford Glass Co.), 1946
[15] U.S. Pat. No. 2,277,823 (American Cyanamid Co.), 1942
[16] E. Hoffmann, C. Laub *Israel J. Chem.* 1970, 8(4), 651-4

Production of the Sample

The resin/curing agent formulations were prepared by weighing out the components in the stated ratio into a porcelain mortar and homogeneously intermixing them by hand. The components were here added such that the epoxy resin was initially introduced and the amine curing agent was added first and in a second step the guanidine curing accelerator was added. After addition, homogeneous intermixing took place.

Determination of Gel Time

Approx. 700-800 mg of freshly prepared sample were weighed out into a small aluminum cup which was placed in a heating block preheated to the stated temperature (start of timing). Gelation testing was carried out with a wooden cocktail stick which was dipped into the liquid resin. When a stable filament was obtained on withdrawal (no dripping any longer), this time was defined as the gel time.

Performance of Pot Test 100 g of the freshly prepared sample were weighed out at room temperature into a 250 ml screw-top jar (start of timing). The temperature profile was recorded by means of a temperature sensor, which was immersed centrally in the sample through a 4 mm hole in the lid, and digitally displayed. The time which had elapsed when the highest temperature was reached was noted down.

Performance of Dynamic DSC Measurements

The sample was heated from 30 to 250° C. at a heating rate of 10 K/min in order to determine the DSC peak temperature (DSC peak T). The DSC onset temperature (DSC onset T) was determined from the same measurement by applying the tangent to the exothermic reaction peak. The isothermal reaction time was determined by introducing a second sample into the DSC furnace by means of a sample injector and maintaining this temperature for at least 40 min. The location of the curing peak corresponded to the time of the maximum exothermic rate and was defined as the isothermal reaction time.

Measurement of Glass Transition Temperature by DSC (Final Tg)

The maximum achievable glass transition temperature (final Tg) was determined using the pregelled sample from the gel time determination. The sample was completely cured by heating to 200° C. (DSC temperature programme: 30 to 200° C., heating rate 20 K/min) and maintaining the temperature for 30 min. After cooling to 30° C., the sample was heated again from 30 to 200° C. at a heating rate of 10 K/min and the Tg determined from the heating curve by applying the tangent at the inflection point of greatest change in thermal capacity (ΔCp).

Measurement of Dynamic Tg by DSC (dyn Tg)

In contrast to the final Tg, the sample was not subjected to a prior temperature programme for the purposes of determining dynamic Tg. The dynamic Tg was determined by heating the sample once from −40 to 250° C. at a heating rate of 10 K/min. Evaluation was performed by applying the tangent at the inflection point of the greatest change in heat capacity (ΔCp).

Definition and Determination of EEW and HEW

Epoxy equivalent weight (EEW) and H equivalent weight (HEW) are defined inter alia in *Faserverbund-Kunststoffe [fibre composite plastics]*, G. W. Ehrenstein, 2006, 2nd edition, Carl Hanser Verlag, Munich, on page 64. Where available, the EEW and HEW values were taken from the manufacturers' technical datasheets. If the HEW was not available, it was determined using the Tg max method. To this end, the final Tg values of resin/curing agent formulations comprising different quantities of curing agent were determined. The HEW of the curing agent was extrapolated back from the composition with the highest final Tg.

Analytical Instruments Used
  Gel time heating block VLM 2.0 HT
  DSC measurements DSC calorimeter Mettler-Toledo DSC 822
  Viscosity rheometer Haake RheoStress 1

Example 1

Gel Time of IPD Curing Agent with Curing Accelerators According to the Invention The resin formulations according to the invention were prepared and tested as described above in accordance with the compositions stated in Table 1.

TABLE 1

Gel time at 80° C.

| Test (according to the invention) | Epoxy resin [parts] | Amine curing agent [parts] | Guanidine curing accelerator [parts] | Gel time at 80° C. [min:sec] |
|---|---|---|---|---|
| 1.1 (no, comparison) | Epikote 828 (100 parts) | IPD (23.0 parts) | — | 13 min 15 sec |
| 1.2 (yes) | Epikote 828 (100 parts) | IPD (23.0 parts) | DMDCD (1.0 part) | 10 min 00 sec |
| 1.3 (yes) | Epikote 828 (100 parts) | IPD (23.0 parts) | AcDCD (1.0 part) | 8 min 00 sec |
| 1.4 (yes) | Epikote 828 (100 parts) | IPD (23.0 parts) | CPDC (1.0 part) | 6 min 30 sec |
| 1.5 (yes) | Epikote 828 (100 parts) | IPD (23.0 parts) | NQ (1.0 part) | 7 min 30 sec |
| 1.6 (yes) | Epikote 828 (100 parts) | IPD (23.0 parts) | MNQ (1.0 part) | 6 min 30 sec |
| 1.7 (yes) | Epikote 828 (100 parts) | IPD (23.0 parts) | ENQ (1.0 part) | 6 min 00 sec |
| 1.8 (yes) | Epikote 828 (100 parts) | IPD (23.0 parts) | BuNQ (1.0 part) | 9 min 00 sec |
| 1.9 (yes) | Epikote 828 (100 parts) | IPD (23.0 parts) | AcGu (1.0 part) | 10 min 00 sec |
| 1.10 (yes) | Epikote 828 (100 parts) | IPD (23.0 parts) | CarbamGu (1.0 part) | 9 min 30 sec |
| 1.11 (yes) | Epikote 828 (100 parts) | IPD (23.0 parts) | MetcarbGu (1.0 part) | 9 min 00 sec |

As a result of adding the curing accelerators according to the invention (1.2-1.11) to the amine curing agent IPD, the gel times at 80° C. were reduced relative to the comparison sample (1.1).

Example 2

Pot Test of Amine Curing Agents with Curing Accelerators According to the Invention The resin formulations according to the invention were prepared and tested as described above in accordance with the compositions stated in Table 2.

TABLE 2

Pot test

| Test (according to the invention) | Epoxy resin [parts] | Amine curing agent [parts] | Guanidine curing accelerator [parts] | Pot test: Time t [min] to max. temp. Tmax [° C.] |
|---|---|---|---|---|
| 2.1 (no, comparison) | Epikote 828 (100 parts) | IPD (23.0 parts) | | T = 127.8° C. t = 175.0 min |
| 2.2 (yes) | Epikote 828 (100 parts) | IPD (23.0 parts) | AcDCD (1.0 part) | T = 187.1° C. t = 50.0 min |
| 2.3 (yes) | Epikote 828 (100 parts) | IPD (23.0 parts) | CPDCD (1.0 part) | T = 182.4° C. t = 45.0 min |
| 2.4 (yes) | Epikote 828 (100 parts) | IPD (23.0 parts) | MNQ (1.0 part) | T = 164.6° C. t = 85.0 min |

As a result of adding the curing accelerators according to the invention (2.2-2.4) to the amine curing agents, the maximum temperatures were reached in a shorter time relative to the comparison sample (2.1).

Example 3

Final Tg of Amine Curing Agents with Curing Accelerators According to the Invention The resin formulations according to the invention were prepared and tested as described above in accordance with the compositions stated in Table 3.

TABLE 3

| | | | | |
|---|---|---|---|---|
| | | Final Tg | | |
| Test (according to the invention) | Epoxy resin [parts] | Amine curing agent [parts] | Guanidine curing accelerator [parts] | Final Tg [° C.] |
| 3.1 (no, comparison) | Epikote 828 (100 parts) | IPD (23.0 parts) | — | 163 |
| 3.2 (yes) | Epikote 828 (100 parts) | IPD (23.0 parts) | NQ (1.0 part) | 167 |
| 3.3 (yes) | Epikote 828 (100 parts) | IPD (23.0 parts) | MNQ (1.0 part) | 165 |

As a result of adding the curing accelerators according to the invention (3.2, 3.3) to the amine curing agents, higher final Tg values were reached relative to the comparison sample (3.1).

Example 4

Tg Profile of the Curing Agent IPD with Curing Accelerators According to the Invention at 60° C.

The resin formulations according to the invention were prepared and tested as described above in accordance with the compositions stated in Table 4.

TABLE 4

| | | | | |
|---|---|---|---|---|
| | | Dynamic Tg profile, 60° C. curing | | |
| Test (according to the invention) | Epoxy resin [parts] | Amine curing agent [parts] | Guanidine curing accelerator [parts] | Tg profile for 60° C. curing [h]/[° C.] |
| 4.1 (no, comparison) | Epikote 828 (100 parts) | IPD (23.0 parts) | | 0 h/−29° C. 1 h/23° C. 2 h/69° C. 48 h/96° C. |
| 4.2 (yes) | Epikote 828 (100 parts) | IPD (23.0 parts) | AcDCD (1.0 part) | 0 h/−32° C. 1 h/52° C. 2 h/72° C. 48 h/94° C. |
| 4.3 (yes) | Epikote 828 (100 parts) | IPD (23.0 parts) | CPDCD (1.0 part) | 0 h/−29° C. 1 h/65° C. 2 h/74° C. 48 h/93° C. |
| 4.4 (yes) | Epikote 828 (100 parts) | IPD (23.0 parts) | MNQ (1.0 part) | 0 h/−28° C. 1 h/60° C. 2 h/75° C. 48 h/95° C. |

As a result of adding the curing accelerators according to the invention (4.2-4.4) to the amine curing agent IPD, the curing profile at 60° C. was accelerated relative to a comparison sample (4.1). In particular, a rapid rise in dyn. Tg values was achieved within the first two hours. The maximum achievable Tg, on the other hand, was identical with the bounds of the range of variation.

The invention claimed is:

1. A method of accelerating curing of a cold-curing epoxy resin composition comprising adding to the cold-curing epoxy resin a guanidine derivative of Formula (I)

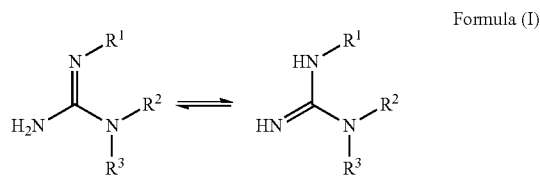

wherein:

$R^1$ is —CN, —NO$_2$ or —(C=O)—R$^4$;

$R^2$ is —H, alkyl, benzyl, phenyl, aryl or —(C=O)—R$^4$;

$R^3$ is —H or alkyl;

$R^4$ is —H, alkyl, or —O-alkyl;

wherein, when $R^1$ is —CN or —(C=O)—R$^4$, $R^2$ is not —H if $R^3$ is —H;

wherein the cold-curing epoxy resin composition further comprises at least one amine curing agent for the epoxy resin which is activatable at a temperature of <60° C.

2. The method of claim 1, wherein the guanidine derivative is selected from the group consisting of 1,1-dimethyl-3-cyanoguanidine, 1-acetyl-3-cyanoguanidine, 1-(p-chlorophenyl)-3-cyanoguanidine, nitroguanidine and, 1-methyl-3-nitroguanidine, 1-ethyl-3-nitroguanidine, 1-butyl-3-nitroguanidine, 1-benzyl-3-nitroguanidine.

3. The method of claim 1, wherein the amine curing agent comprises at least two free amine groups and is selected from the group consisting of an alkyldiamine, an aryldiamine, an alkylpolyamine, an arylpolyamine, and a polyetheramine.

4. The method of claim 1, wherein the amine curing agent is selected from the group of an ethylenediamine, a diethylenetriamine, a triethylenetetramine, a meta-xylylenediamine, a methylenedianiline, a para-minocyclohexylmethane, an isophoronediamine and a polyetheramine.

5. The method of claim 1, wherein the guanidine derivative is present in a quantity of 0.1 to 15 wt. % relative to the epoxy resin composition.

6. The method of claim 1, wherein the guanidine derivative is present in a ratio of 0.1 to 15 parts relative to 100 parts of epoxy resin.

7. The method of claim 1, wherein the amine curing agent comprises at least two free amine groups and is selected from the group consisting of an alkyldiamine, an aryldiamine, an alkylpolyamine and an arylpolyamine, and wherein the cold-curing epoxy resin composition does not contain a polyetheramine.

8. The method of claim 1, wherein the amine curing agent is selected from the group of an ethylenediamine, a diethylenetriamine, a triethylenetetramine, a meta-xylylenediamine, a methylenedianiline, a para-aminocyclohexylmethane and an isophoronediamine, and wherein the cold-curing epoxy resin composition does not contain a polyetheramine.

9. A cold-curing epoxy resin composition comprising:
a guanidine derivative of Formula (I)

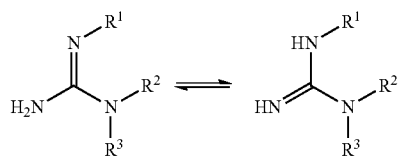

wherein:
R$^1$ is —CN, —NO$_2$ or —(C=O)—R$^4$;
R$^2$ is —H, alkyl, benzyl, phenyl, aryl or —(C=O)—R$^4$;
R$^3$ is —H or alkyl;
R$^4$ is —H, alkyl, or —O-alkyl;
wherein, when R$^1$ is —CN, or —(C=O)—R$^4$, R$^2$ is not —H if R$^3$ is —H;
a cold-curing epoxy resin, and an amine curing agent for the epoxy resin which is activatable at a temperature of <60° C.

10. A cold-curing epoxy resin composition according to claim 9, wherein the curing accelerator is selected from the group consisting of 1,1-dimethyl-3-cyanoguanidine, 1-acetyl-3-cyanoguanidine, 1-(p-chlorophenyl)-3-cyanoguanidine, nitroguanidine, 1-methyl-3-nitroguanidine, 1-ethyl-3-nitroguanidine, 1-butyl-3-nitroguanidine, and 1-benzyl-3-nitroguanidine.

11. A cold-curing epoxy resin composition according to claim 9, wherein the amine curing agent comprises at least one member selected from the group consisting of an alkyldiamine, aryldiamine, alkylpolyamine, arylpolyamine and polyetheramine, wherein the amine curing agent in each case comprises at least two free amine groups.

12. A cold-curing epoxy resin composition according to claim 9, wherein the amine curing agent is selected from the group of ethylenediamine, diethylenetriamine, triethylenetetramine, meta-xylylenediamine, methylenedianiline, para-aminocyclohexylmethane, isophoronediamine and a polyetheramine.

13. A cold-curing epoxy resin composition according to claim 9, wherein the composition further comprises at least one member selected from the group consisting of auxiliary substance and an additive.

14. A cold-curing epoxy resin composition according to claim 13, wherein the auxiliary substance or additive is selected from the group consisting of a reactive diluent, a filler, a rheological additive, a thixotroping agent, a dispersion additive, an anticaking agent, a dye, a pigment, an impact modifier and a flameproofing additive.

15. A method for producing a cold-curing epoxy resin composition according to claim 9 comprising the steps of:
a. providing the cold-curing epoxy resin, wherein the cold-curing epoxy resin has on average more than one epoxy group per molecule,
b. adding the amine curing agent for the cold-curing epoxy resin which is activatable at a temperature of <60° C.,
c. adding the curing accelerator;
with the proviso that method steps b) and c) proceed in succession or simultaneously.

16. A method according to claim 15, wherein the amine curing agent is added first and thereafter the curing accelerator is added.

17. A method according to claim 15, further comprising, adding, before steps b) or c), an auxiliary substance or an additive.

18. A method according to claim 17, wherein the auxiliary substance or additive is selected from the group consisting of a reactive diluent, a filler, a rheological additive, a thixotroping agent, a dispersion additive, an anticaking agent, a dye, a pigment, an impact modifier and a flameproofing additive.

19. A method according to claim 15 that is conducted without input of heat.

20. A cold-curing epoxy resin composition according to claim 9, wherein the amine curing agent comprises at least one member selected from the group consisting of an alkyldiamine, aryldiamine, alkylpolyamine and arylpolyamine, wherein the amine curing agent in each case comprises at least two free amine groups, and wherein the cold-curing epoxy resin composition does not contain a polyetheramine.

21. A cold-curing epoxy resin composition according to claim 9, wherein the amine curing agent is selected from the group of ethylenediamine, diethylenetriamine, triethylenetetramine, meta-xylylenediamine, methylenedianiline, para-aminocyclohexylmethane and isophoronediamine, and wherein the cold-curing epoxy resin composition does not contain a polyetheramine.

22. A method of accelerating curing of a cold-curing epoxy resin composition comprising adding to the cold-curing epoxy resin a guanidine derivative of Formula (I)

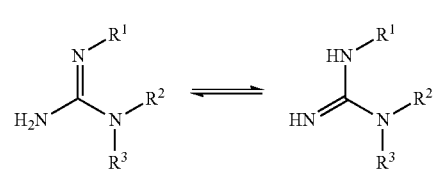

wherein:
R$^1$ is —CN, —NO$_2$ or —(C=O)—R$^4$;
R$^2$ is —H, alkyl, benzyl, phenyl, aryl or —(C=O)—R$^4$;
R$^3$ is —H or alkyl;
R$^4$ is —H, alkyl, or —O-alkyl;
wherein, when R$^1$ is —CN or —(C=O)—R$^4$, R$^2$ is not —H if R$^3$ is —H;
wherein the cold-curing epoxy resin composition further comprises at least one amine curing agent for the epoxy resin which is activatable at a temperature of <60° C., and wherein the cold-curing epoxy resin composition does not contain a polyetheramine.

23. A cold-curing epoxy resin composition comprising:
a curing accelerator comprising guanidine derivative of Formula (I)

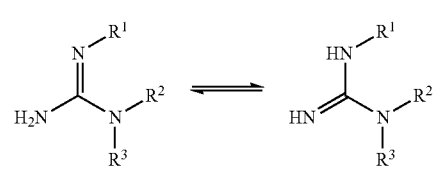

wherein:
R$^1$ is —CN, —NO$_2$ or —(C=O)—R$^4$;
R$^2$ is —H, alkyl, benzyl, phenyl, aryl or —(C=O)—R$^4$;
R$^3$ is —H or alkyl;
R$^4$ is —H, alkyl, or —O-alkyl;
wherein, when R$^1$ is —CN or —(C=O)—R$^4$, R$^2$ is not —H if R$^3$ is —H;

a cold-curing epoxy resin, and an amine curing agent for the epoxy resin which is activatable at a temperature of <60° C., and wherein the cold-curing epoxy resin composition does not contain a polyetheramine.

* * * * *